United States Patent Office 3,682,742
Patented Aug. 8, 1972

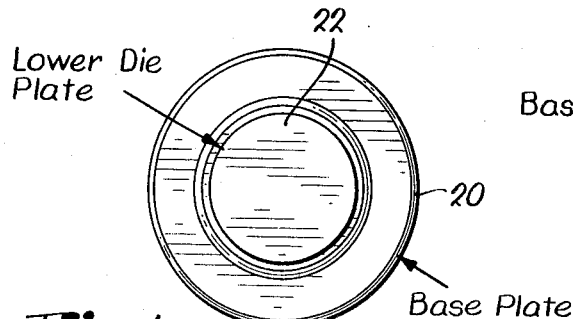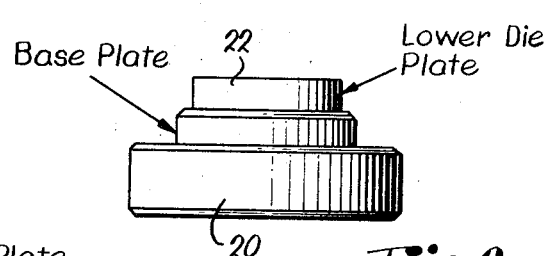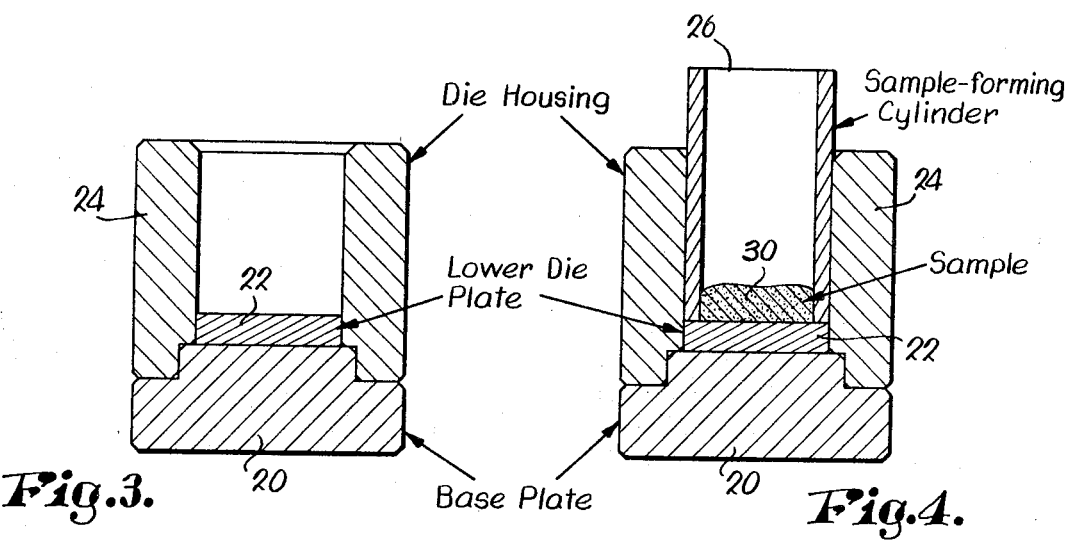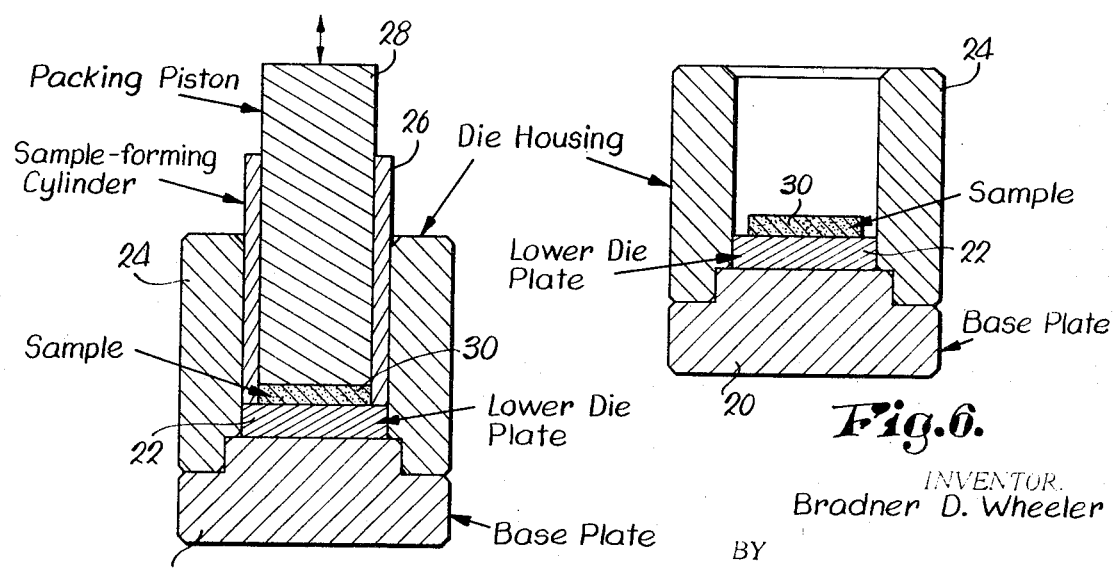

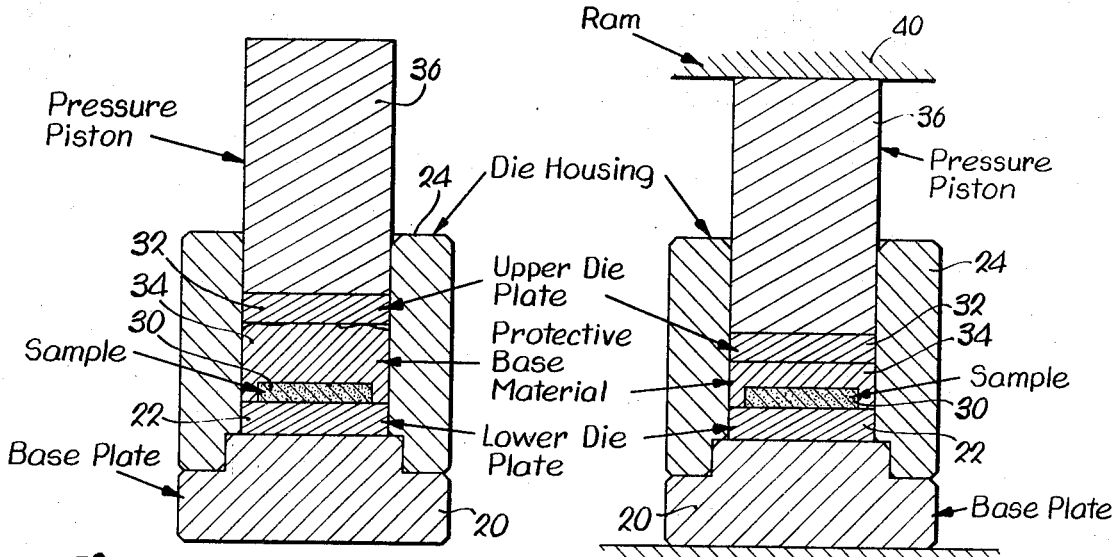
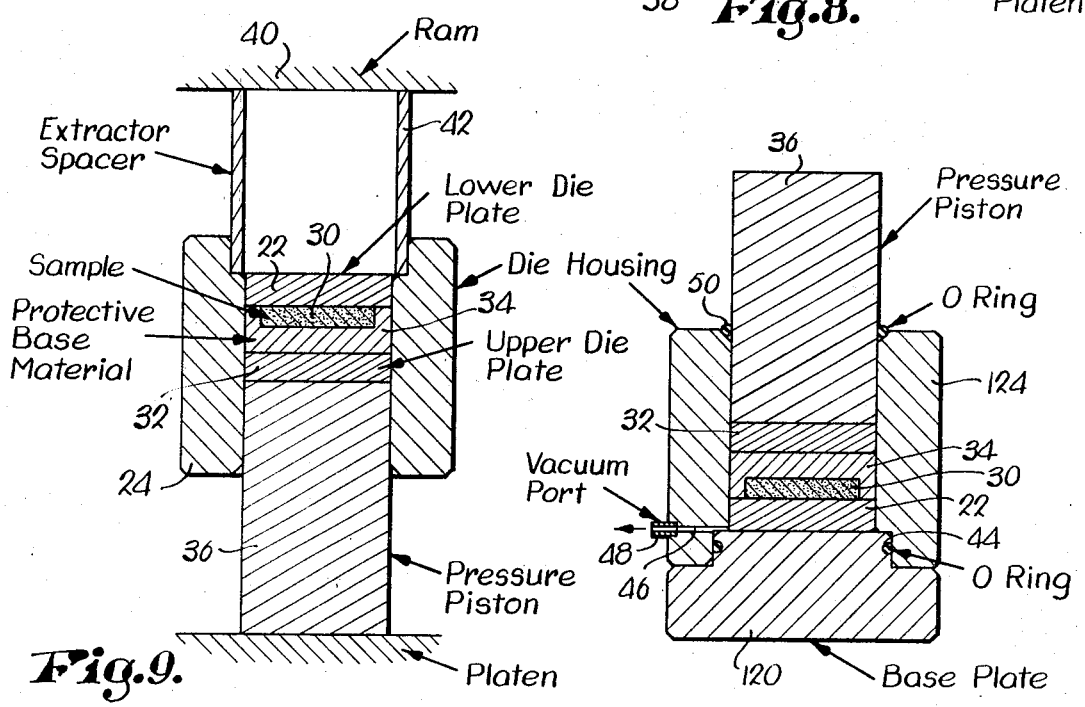
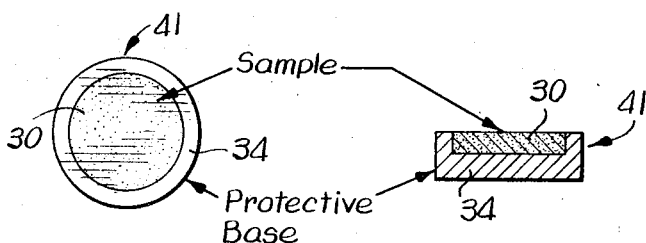

3,682,742
APPARATUS FOR PREPARING SPECTROGRAPHIC SAMPLE
Bradner D. Wheeler, 9023 Outlook Drive,
Overland Park, Kans. 66207
Filed Apr. 15, 1970, Ser. No. 28,723
Int. Cl. B29j 1/00
U.S. Cl. 425—109   6 Claims

ABSTRACT OF THE DISCLOSURE

An apparatus for forming a sample of particulate material for purposes of spectrographic analysis utilizes a housing in which the sample of material is compacted into a self-sustaining mass through the use of a tubular forming member. The forming member is then removed and a quantity of protective material is placed around the mass in a manner to leave a portion of the latter uncovered. The protective material and the mass of sample material are then compressed into a rigid body, the uncovered portion of which presents a planar surface, by a pressure piston which is positionable within the housing. After the rigid body is formed the base member of the housing is removed and replaced by a tubular extractor which receives the rigid body upon continued movement of the pressure piston.

---

This invention relates to a method and apparatus for preparing analytical samples and, more particularly, to a method and apparatus for preparing a sample for spectrographic analysis.

In preparing samples for analytical procedures it is imperative to have a sample which will withstand whatever handling is necessary to perform the analysis. In X-ray spectrography the sample being analyzed must be compressed into a body having a planar surface and sufficient strength to withstand certain physical stresses which are encountered during the analysis. It is also desirable for the sample to withstand the analysis without any effect upon its physical condition to allow the sample to be retrieved for reanalysis and comparative testing.

Prior methods and apparatus for preparing samples for spectrographic analysis have utilized metal retainer rings into which the sample being analyzed is compressed. This frequently results in crumbling of the sample since the metal ring expands under pressure and the contracts when this pressure is relieved. Furthermore, such metal rings protect only the sides of the sample and offer no protection or support for the major portion of the planar surface.

The present invention overcomes the disadvantages of the prior art methods by providing an apparatus and method for compressing a quantity of protective material around a mass of the material to be analyzed in a manner to leave a planar surface of the mass of material uncovered while the remainder of the mass is completely surrounded by the protective material. The protective material is selected for its compressibility into a cohesive rigid body with the sample material, and also for its unreactivity with the sample.

It is, therefore, an object of the present invention to provide a method and apparatus for preparing a sample for spectrographic analysis wherein the sample is completely surrounded by a protective material except for a single planar surface.

Another object of the invention is to provide a method and apparatus for preparing a sample for spectrographic analysis wherein the sample is retrievable as a result of the layer of protective material in which it is encased.

A further object of the invention is a method and apparatus for preparing an analytical sample wherein the sample material is required to be compressed and wherein a protective layer is provided around the sample, which layer is not subject to expansion under substantial compressive forces.

An important object of the invention is also a method and apparatus as described in the foregoing objects which are easily reproducible to assure continuity of results between a number of analytical samples.

An aim of the invention is to provide a method and apparatus for forming a protective layer around a sample of material, which protective layer is initially in particulate form to preclude possible intermixing between the material and the sample.

Another object of the invention is a method of preparing an analytical sample wherein the sample is enclosed in a layer of protective material and the material and the sample are compressed into a rigid body with the protective material being selected with due regard for its properties as a lubricant to assure easy removal of the body from the compression apparatus.

Referring to the drawings:

FIG. 1 is a top plan view of the baseplate and lower die plate which form a part of the apparatus of the invention;

FIG. 2 is a side elevational view of the die plate and baseplate of FIG. 1;

FIG. 3 is a central vertical, cross-sectional view of the apparatus shown in FIG. 2 after the die housing has been positioned thereon;

FIG. 4 is a cross-sectional view similar to FIG. 3 after the sample-forming cylinder has been positioned within the die housing and a sample of particulate material disposed within the forming cylinder;

FIG. 5 is a cross-sectional view similar to FIG. 4 after a packing piston has been positioned within the sample-forming cylinder to compact the sample into a self-sustaining mass;

FIG. 6 is a cross-sectional view similar to FIG. 5 after removal of the sample-forming cylinder and the packing piston;

FIG. 7 is a cross-sectional view similar to FIG. 6 after the protective base material has been placed around the sample mass, the upper die plate positioned over the protective base material and the pressure piston disposed within the die housing;

FIG. 8 is a cross-sectional view similar to FIG. 7 illustrating the manner in which the pressure ram forces the pressure piston downwardly within the die housing to compress the protective material and the sample mass into a rigid body;

FIG. 9 is a cross-sectional view similar to FIG. 8 after the baseplate has been removed from the housing and the latter along with the pressure piston rotated 180°, and the extractor spacer positioned intermediate the housing and the pressure ram;

FIG. 10 is a top plan view of the rigid body formed from the sample mass and the layer of protective material;

FIG. 11 is a central vertical, cross-sectional view of the body shown in FIG. 10; and FIG. 12 is a vertical, cross-sectional view similar to FIGS. 3–9 illustrating an alternative form of the invention which employs means for coupling a vacuum to the interior of the die housing.

Referring initially to FIGS. 1–4 it is seen that a circular baseplate 20 is provided with a central upstanding, circular boss on which a lower die plate 22 is seated. A cylindrical die housing 24 is open at opposite ends and includes a shoulder-defining portion for seating the housing 24 upon the baseplate 20. A cylindrical, tubular sample-forming cylinder 26 having an external diameter equal to the internal diameter of the housing 24 presents a forming member which is positionable within the housing 24.

Continuing to FIGS. 5, 7 and 8, it is seen that a packing piston 28 is reciprocable within the sample-forming cylinder member 26 for compacting a sample of material 30 previously deposited therein into a self-sustaining mass. Upon removal of the packing piston 28 an upper die plate 32 is positionable within the die housing 24 subsequent to the deposition of a quantity of protective base material 34 around the sample material 30. A pressure piston 36 is positionable within the die housing 24 in stacked relationship to the die plate 32 as illustrated in FIG. 7. After positioning the pressure piston 36 within housing 24, the entire assembly is placed upon the platen 38 of a pressure ram 40 whereupon the mass of sample material 30 and the protective base material 34 are compressed into a rigid body 41 shown in FIGS. 10 and 11.

Referring now to FIG. 9, upon removal of the baseplate 20 and rotation of the housing 24 and pressure piston 36 180°, a tubular extractor spacer 42 is positionable proximal to the open end of the housing 24 in abutting relationship to the shoulder therein. The tubular extractor 42 has an inside diameter larger than the corresponding outside dimension of the rigid body 41 presented by the sample 30 and the protective material 34 to permit the body to be received within the extractor 42 upon downward movement of the ram 40 which forces the pressure piston 36 in the direction of the open end adjacent the extractor 42.

Returning now to FIGS. 3–6, operation of the aforedescribed apparatus will be explained in conjunction with a description of the steps of the inventive method. The die housing 24 is supported upon the baseplate 20 and the cylinder member 26 is then inserted within the housing. A quantity of the sample material which is normally in particulate form is then placed within the cylinder 26. Next, the sample 30 is compacted into a self-sustaining mass by reciprocating the packing piston 28 within the cylinder member 26. As illustrated in FIG. 6, upon removal of the packing piston 28 and the cylinder member 26, a self-sustaining mass of the sample 30 is presented, which mass is of circular configuration and a definite uniform thickness. It will also be appreciated that the two opposed sides of the mass of sample material 30, one of which is formed by the lower die plate 22 and the other of which is formed by the packing piston 28, present perfectly planar surfaces.

Referring again to FIGS. 7 and 8, the protective base material 34, which is preferably either boric acid or cellulose, is deposited around the sample mass 30 while the latter remains positioned upon the lower die plate 22 thereby assuring that the planar surface of the sample, which is in engagement with the lower die plate, remains uncovered by the base material 34. The base material is characterized by the property of being capable of forming a coherent body upon compression thereof and thus the upper die plate 32 and the pressure piston 36 are positioned within the housing 24 as illustrated in FIG. 7. Subsequently, the assembled components are inserted between the platen 38 and the pressure ram 40 and a force is applied to the pressure piston 36 to compress the protective material 34 and the mass of sample material 30 into the rigid body 41.

Removal of the rigid body 41 from the housing 24 is preferably accomplished by raising the pressure ram 40 and then rotating the piston 36, housing 24 and baseplate 20 180°, after which the baseplate is removed from the housing 24 and the extractor 42 is substituted therefor at the end of the housing opposite the pressure piston 36. A force is then continued against the pressure piston 36 by downward movement of the ram 40 to force the piston in the direction of the rigid body 41 to remove the latter from the die housing. The body 41 is received within the extractor 42 after which the ram 40 is raised and the assembly removed. The body 41 is easily removed from the extractor 42 after the latter has been disassembled from the housing 24.

It will be appreciated from viewing FIGS. 10 and 11 that the rigid body 41 which comprises the mass of particulate sample material 30 compacted to present a planar surface, and the layer of cohesive particulate protective material 34 which is rigid with the mass 30 and compressed therearound so as to leave the aforementioned planar surface uncovered, presents a sample which is particularly adapted for spectrographic analysis. The protective base material 34 is preferably chosen with due regard for its unreactivity with the sample material 30 and is also normally in particulate form to preclude any possible intermixing between the two materials. Cellulose and boric acid are both desirable because they possess the aforementioned properties, are capable of being compressed into a cohesive body, and act as lubricants with respect to the die housing 24 which is normally constructed from metal to thus facilitate removal of the rigid body 41 from within the housing 24.

Referring now to the alternative embodiment of the invention which is illustrated in FIG. 12, it is seen that a circular baseplate 120 has a circular upstanding boss and an O-ring 44 disposed within a circumscribing groove in the vertical wall of the boss. The lower die plate 22 is positioned upon the upstanding boss in the same manner as previously described for the preferred embodiment. A cylindrical, open-ended housing 124 is positioned upon the baseplate 120 and has a passage 46 therethrough which communicates the interior of the housing with a vacuum port presented by a nipple 48. The pressure piston 36 is positionable within the housing 124 in the same manner as previously described in the preferred embodiment subsequent to the formation of the self-sustaining sample mass 30, the deposition of the layer of protective base material 34 therearound, and the placing of the upper die plate 32 upon the protective material. A second O-ring 50 completes sealing of the interior of the housing 124.

Utilizing this alternative form of the invention the method of sample forming includes the additional step of applying a vacuum to the interior of the housing 124 as the compressive force is applied to the mass of sample material 30 and the protective base material 34 through the pressure piston 36 to form the materials into the rigid body 41. This alternative method is desirable where the sample material is a compound such as clay having substantial air pockets therein, which air is difficult to remove and interferes with the compression of the sample into a rigid body with the protective base material.

It is to be emphasized that the bore diameter of the housing 24 is not critical and will normally vary according to the requirements of individual users. Also, while a cylindrical housing and sample-forming cylinder are much preferred to assure a rigid body 41 of uniform strength and to avoid corners which are particularly susceptible to damage in handling as would be the case with a polygonal housing and forming cylinder, in certain instances configurations other than the cylindrical configuration illustrated may be found desirable.

Having thus described the invention, what is claimed as new and desired to be secured by Letters Patent is:

1. Apparatus for forming a sample of particulate material into a rigid body comprising:
   a tubular housing open at opposite ends thereof;
   a removable base member closing one end of the housing and provided with a boss thereon telescoped into said one end of the housing;
   a tubular sample-forming member positionable within said housing;
   a packing piston reciprocable within said sample-forming member for compacting a sample of material previously deposited therein into a self-sustaining mass; and a pressure piston positionable within said housing upon removal of said packing piston and said tubular sample-forming member therefrom and subsequent to the deposition of a quantity of protective material therein, for compressing said protective material and the mass of sample material into a rigid body.

2. Apparatus as set forth in claim 1, wherein said housing is provided with means for coupling a vacuum to the interior thereof.

3. Apparatus as set forth in claim 1 wherein is included a tubular extractor positionable proximal said second open end, said extractor having an inside dimension larger than the corresponding outside dimension of said rigid body whereby said rigid body is received within said extractor upon movement of said pressure piston in the direction of said second open end.

4. Apparatus as set forth in claim 3, wherein said housing and said sample-forming member are cylindrical and the outside diameter of said sample-forming member is equal to the inside diameter of said housing.

5. Apparatus as set forth in claim 4, wherein said housing includes a shoulder-refining portion and said boss of the base member and said extractor are configured for complemental positioning within said housing in abutting relationship to said shoulder.

6. Apparatus as set forth in claim 5, wherein is included a lower die plate positionable upon said base member; and an upper die plate positionable upon said protective material for engagement by said pressure piston.

References Cited

UNITED STATES PATENTS

| 3,463,641 | 8/1969 | Berardi et al. | 107—18 |
| 1,822,939 | 9/1931 | Stout et al. | 18—16 R |
| 2,834,048 | 5/1958 | Wright | 18—16 R |

FOREIGN PATENTS

| 89,694 | 9/1960 | Denmark. |
| 831,074 | 3/1960 | England. |

BENJAMIN A. BORCHELT, Primary Examiner

H. TUDOR, Assistant Examiner

U.S. Cl. X.R.

107—14 B; 156—62.2